Patented June 11, 1935

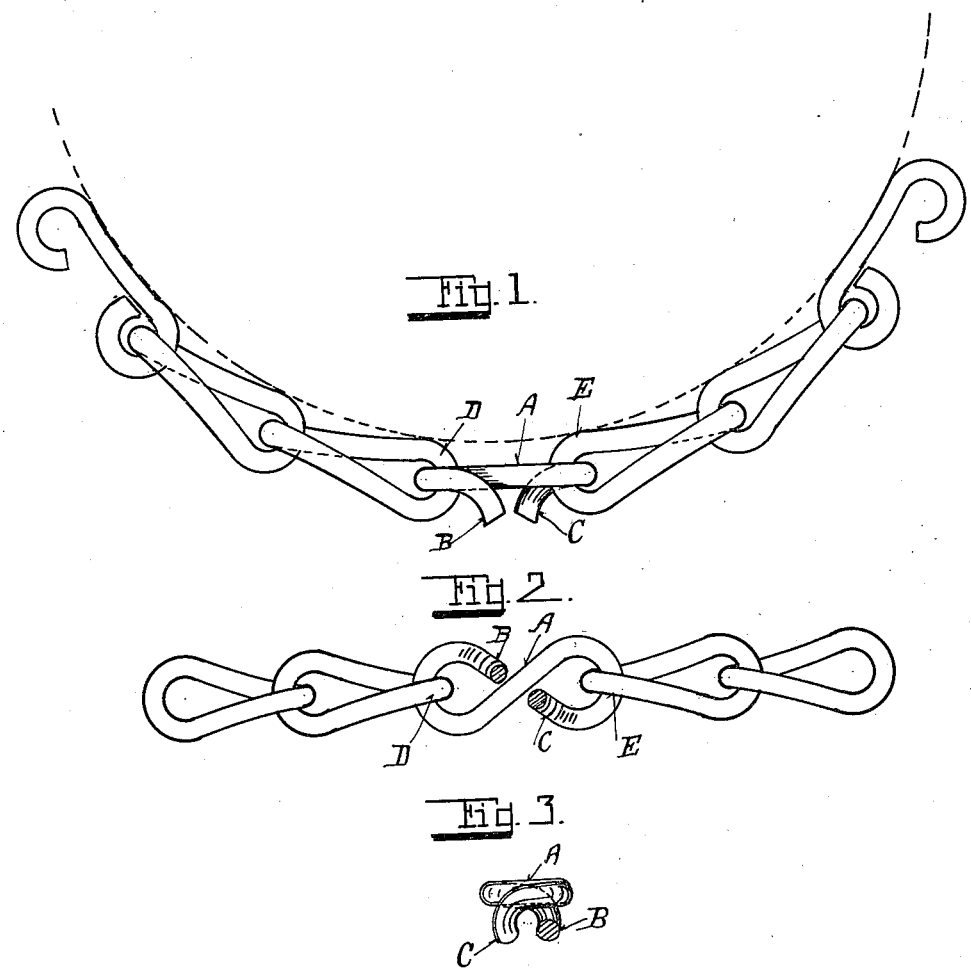

2,004,677

UNITED STATES PATENT OFFICE 2,004,677

REPAIR LINK

Lloyd Stowe, Corry, Pa., assignor to Raymond Manufacturing Company, Corry, Pa., a corporation of Pennsylvania Application September 6, 1927, Serial No. 217,835

1 Claim. (Cl. 59—85)

This invention relates to self-closing links for repairing broken cross chains of anti-skid tire chains.

By means of the self-closing repair links according to the present invention, should one of the links of the cross chain become weakened by wear so that it breaks, the ends of such cross chain may be easily secured together by hooking such ends to the opposite ends of the self-closing repair link, which will attach together the ends of the broken cross chain so that they will not slap against the vehicle fenders as the wheel revolves.

The repair link according to the present invention may be easily attached to the loose end links of a broken chain, without the use of pliers or other tools, and the turned out ends of the link, when the link is attached in place, do not necessarily contact with the tire, but the link may, if desired, be placed so that such ends will project outwardly from the tire whereby they are pressed into closed position by the weight of the vehicle as the wheel revolves over them.

Other objects and features of novelty will be apparent from the following description and the annexed drawing, it being expressly understood, however, that the invention is in no way limited thereby, or otherwise than by the appended claim.

Referring to the drawing, in which similar reference characters refer to like parts:

Figure 1 is a view of a cross-chain, of a tire chain, a repair link according to the present invention being shown attaching the ends of the cross-chain together.

Figure 2 is a plan view of the assembly shown in Figure 1.

Figure 3 is an end view of the self-closing repair link according to the present invention.

Referring to the drawing, the reference letter A denotes a portion of the wire from which the repair link according to the invention may be made. One end of the wire A is bent back upon itself as at B, and the other end is bent back upon itself as at C to thereby form two loops, the same being connected by the cross-over or diagonal portion A.

As clearly disclosed in Fig. 1, the ends of the link, after being bent, as described above, to form a loop at each end of the link, are both bent out of the plane of the link, so that the diagonal portion A of the link extends from one loop diagonally to the loop at the opposite end of the link, and forms the base of the link upon which the tire may bear as such tire presses the link down upon the pavement.

The ends B and C of the link A are turned out of the plane of the link so that the ends are far enough from the diagonal cross-over portion of the link to permit the end links D, E of the broken cross-chain to pass therebetween into the loops at the ends of the repair link.

The repair links are preferably formed of metal of great tensile strength, but which may be easily deformed into closed position by the weight of the vehicle as the wheel rolls over them, so that the ends B and C will be quickly deformed from the position shown in Figs. 1 and 3 approximately into the plane of the cross-over portion A, so that the link will form in its closed position, a nearly perfect figure-of-eight. It will be seen that neither of the ends B, C will project toward the tread of the tire.

Having thus fully shown and described my invention so that others may utilize the same, what I claim as new and desire to secure by Letters Patent is:

A repair link for tire chains composed of a wire rod bent into two open loops with the intermediate portion thereof positioned diagonally therebetween, the free end portion of each loop being bent outwardly out of the plane of said diagonal portion and being of such a length that it will substantially abut but not overlap the diagonal portion when in closed position, the ends of said loops being adapted to be bent into closed position in the plane of said diagonal portion.

LLOYD STOWE.